US008126650B2

(12) United States Patent
Lu et al.

(10) Patent No.: US 8,126,650 B2
(45) Date of Patent: Feb. 28, 2012

(54) METHOD FOR DETERMINING PHYSICAL PROPERTIES OF STRUCTURES

(75) Inventors: Xinyou Lu, Missouri City, TX (US);
James J. Carazzone, Houston, TX (US)

(73) Assignee: ExxonMobil Upstream Research Co., Houston, TX (US)

( * ) Notice: Subject to any disclaimer, the term of this patent is extended or adjusted under 35 U.S.C. 154(b) by 448 days.

(21) Appl. No.: 12/304,444

(22) PCT Filed: Jun. 13, 2007

(86) PCT No.: PCT/US2007/013854
§ 371 (c)(1),
(2), (4) Date: Dec. 11, 2008

(87) PCT Pub. No.: WO2008/013613
PCT Pub. Date: Jan. 31, 2008

(65) Prior Publication Data
US 2009/0204327 A1    Aug. 13, 2009

Related U.S. Application Data

(60) Provisional application No. 60/833,089, filed on Jul. 25, 2006.

(51) Int. Cl.
G01V 3/38    (2006.01)
G01V 3/00    (2006.01)
G06F 19/00    (2011.01)

(52) U.S. Cl. .................... 702/11; 73/152.01; 73/152.02; 166/250.01; 702/189

(58) Field of Classification Search ............... 73/152.01, 73/152.02, 865.8, 866; 166/244.1, 250.01; 175/40, 41, 50; 181/101; 324/200, 201, 324/260, 323, 332, 344, 347, 348, 349, 350; 367/14, 15, 37, 38; 702/1, 2, 6, 7, 8, 11, 702/13, 57, 127, 187, 189
See application file for complete search history.

(56) References Cited

U.S. PATENT DOCUMENTS
2,713,147 A * 7/1955 Stripling ...................... 324/323
(Continued)

FOREIGN PATENT DOCUMENTS
WO    WO 02/065374 A2 *  8/2002
(Continued)

OTHER PUBLICATIONS

Backus, G. et al. (1968), "The Resolving Power of Gross Earth Data," *Geophysics J.R. astr. Soc.* 16, pp. 169-200.
(Continued)

*Primary Examiner* — Edward Cosimano
(74) *Attorney, Agent, or Firm* — ExxonMobil Upstream Research Co. Law Dept.

(57) ABSTRACT

Method for efficient inversion of controlled-source electromagnetic survey data to obtain a resistivity model of the subsurface of the survey area. The method extracts the dimensions and location of sub-surface structures as they may be revealed by existing seismic or other available high resolution survey data from the subsurface area (33). This structure geometry information is used to construct a discretization (grid, or mesh) for the inversion computation (34) that is different from the mesh used for the forward modeling calculations (32) in that (a) it has fewer and hence larger cells; and (b) the cells honor the assumed structural information. The inversion need only extract resistivity information (35), the geometry of the resistive structures being specified by the inversion mesh.

13 Claims, 13 Drawing Sheets

U.S. PATENT DOCUMENTS

| | | | |
|---|---|---|---|
| RE24,280 E * | 2/1957 | Stripling | 324/323 |
| 5,563,513 A * | 10/1996 | Tasci et al. | 324/359 |
| 6,534,986 B2 * | 3/2003 | Nichols | 324/339 |
| 6,603,313 B1 | 8/2003 | Srnka | |
| RE39,844 E * | 9/2007 | Srnka | 324/354 |
| RE40,321 E * | 5/2008 | Srnka | 324/354 |
| 7,634,395 B2 * | 12/2009 | Flandrin et al. | 703/10 |
| 7,756,642 B2 * | 7/2010 | Abubakar et al. | 702/7 |
| 7,894,989 B2 * | 2/2011 | Srnka et al. | 702/2 |
| 8,014,988 B2 * | 9/2011 | Wahrmund et al. | 703/10 |
| 2002/0000808 A1 * | 1/2002 | Nichols | 324/339 |
| 2005/0140373 A1 | 6/2005 | Li et al. | |
| 2005/0273303 A1 * | 12/2005 | Flandrin et al. | 703/10 |
| 2009/0005993 A1 * | 1/2009 | Abubakar et al. | 702/7 |
| 2009/0005994 A1 * | 1/2009 | Srnka et al. | 702/7 |
| 2009/0096457 A1 * | 4/2009 | Srnka et al. | 324/334 |
| 2009/0157320 A1 * | 6/2009 | Abubakar et al. | 702/11 |
| 2009/0306900 A1 * | 12/2009 | Jing et al. | 702/13 |
| 2010/0326669 A1 * | 12/2010 | Zhu et al. | 166/369 |
| 2010/0332198 A1 * | 12/2010 | Wahrmund et al. | 703/2 |

FOREIGN PATENT DOCUMENTS

| | | | |
|---|---|---|---|
| WO | WO 2007/018869 A1 * | 2/2007 | |
| WO | WO 2007/130205 A2 * | 11/2007 | |
| WO | WO 2008/013613 A2 * | 1/2008 | |
| WO | WO 2008/033184 A2 * | 3/2008 | |
| WO | WO 2009/126375 A1 * | 10/2009 | |

OTHER PUBLICATIONS

Benech, C. et al. (2002), "Joint inversion of EM and magnetic data for near-surface studies," *Geophysics* 67, pp. 1729-139.

Billette, F.J. et al. (2005), Paper B035, EAGA 67$^{th}$ Conference & Exhibition, Madrid Spain, pp. 1-4.

Clapp, R.G. et al. (2004), "Incorporating geologic information into reflection tomography," *Geophysics* 69, pp. 533-546.

Constable, S.C. et al. (1987), "Occam's inversion: a practical algorithm for generating smooth models from electromagnetic sounding data," *Geophysics* 52, pp. 289-300.

Franklin, J.N. (1970), "Well-Posed Stochastic Extensions of Ill-Posed Problems," *J. Math. Anal. Appl.* 31, pp. 682-716.

Grau, G. et al. (1993), "Sequential migration-aided reflection tomography: an approach to imaging complex structures," *Journal of Applied Geophysics* 30, pp. 75-87.

Hoversten, G.M. et al. ((2006), "Direct reservoir parameter estimation using joint inversion of marine seismic AVA and CSEM data," *Geophysics* 71, No. 3, pp. C1-C13.

Jegen, M.D. et al. (2001), "Using homotopy to invert geophysical data," *Geophysics* 66, No. 6, pp. 1749-1760.

Jordon, T.H. et al. (1971), "Optimal solutions to a linear inverse problem in geophysics," *Proc. Nat. Acad. Sci.* 68, 291-293.

Lines, L.R. et al. (1988), "Cooperative inversion of geophysical data," *Geophysics* 53, pp. 8-20.

Lu, X. et al. (1999), "Rapid relaxation inversion of CSAMT data," *Geophysics J. Int.* 138, pp. 381-392.

Menke, W. (1989), "Geophysical Data Analysis: Discrete Inverse Theory," Academic Press, San Diego California, v. 45, pp. 119-125.

Newman, G.A. et al. (1997), "Three-dimensional massively parallel electromagnetic inversion—I. Theory," *Geophysics J. Intl.* 128, pp. 345-354.

Oldenburg, D.W. (1979), "One Dimensional inversion of natural source magnetotelluric observations," *Geophysics* 44, pp. 1218-1244.

Papazov, S.P. et al. (1995), "Solution of Inverse Problems by Using FEM and Structural Functions," *IEEE Transactions on Magnetics* 31, No. 6, pp. 4297-4305.

Parker, R.L. (1975), "The Theory of Ideal Bodies for Gravity Interpretation," *Geophysics J.R. astr. Soc.* 42, pp. 315-334.

Parker, R.L. (1980), "The Inverse Problem of Electromagnetic Induction: Existence and Construction of Solutions Based on Incomplete Data," *J. Geophysics Res.* 85, pp. 4421-4428.

Savino, J.M. et al. (1980), "Simultaneous inversion of multiple geophysical data sets for earth structure," *SEG 45$^{th}$ Annual International Meeting*, pp. 438-439.

Smith, J.T. et al. (1988), "Magnetotelluric inversion for minimum structure," *Geophysics* 53, pp. 1565-1576.

Vozoff, K. et al. (1974), "Joint Inversion of Geophysical Data," *Geophysics J. R. astr. Soc.* 42, pp. 977-991.

West, G.F. et al. (1987), "Physics of Electromagnetic Induction Exploration Method," *Electromagnetic Methods in Applied Geophysics* (ed. M.N. Nambighian), Society of Exploration Geophysicists, v. 2, pp. 5-45.

Wu, N. (1994), "High Resolution Electromagnetic Images of Conductivity Structure in the Mid-Lower Crust and Upper Mantle," *Ph.D. Dissertation, Univ. of Washington*, pp. 39-44.

*European Search Report*, dated Dec. 15, 2006 (RS 114275).

*International Search Report & Written Opinion*, dated Feb. 14, 2008 for PCT/US2007/013854.

\* cited by examiner

METHOD FOR DETERMINING PHYSICAL PROPERTIES OF STRUCTURES

This application is a National Stage entry under 35 U.S.C. 371 of PCT/US2007/013854 that published as WO 2008/013613 and was filed on Jun. 13, 2007 and claims the benefit of now expired U.S. Provisional application 60/833,089 which was filed on Jul. 25, 2006.

FIELD OF THE INVENTION

This invention relates generally to the field of geophysical prospecting and, more particularly, to electromagnetic prospecting. Specifically, the invention is an efficient method for inverting controlled-source electromagnetic data to obtain a subsurface resistivity data volume, wherein subsurface structures are identified from pre-existing high resolution survey data such as seismic data, and this geometric information is used to define cells in an inversion computational grid having fewer cells than the mesh used for forward modeling.

BACKGROUND OF THE INVENTION

The most widely used techniques for geological surveying and hydrocarbon exploration are seismic methods. The seismic methods can image the structures of the sub-seafloor strata and reveal the location and shape of a potential reservoir, but face well documented difficulties in determining reservoir saturation. Conventionally, the solution to this is to drill a borehole into the reservoir. The costs of drilling a borehole offshore are expensive, often in tens of million dollars. Very recently, electromagnetic methods, for example controlled source electromagnetic methods ("CSEM") and magnetotellurics ("MT"), have been developed for determining or mapping sub-seafloor resistivity variations. See, for example, U.S. Pat. No. 6,603,313 to Srnka. While seismic properties of hydrocarbon-filled and water-filled reservoirs do not differ significantly, their electromagnetic properties can be significantly different. For example, the resistivity difference between the two cases can be up to two orders in magnitude. Electromagnetic ("EM") methods exploit these differences to predict the nature of a reservoir and save cost in hydrocarbon exploration. EM data inversion provides a technology to realize this exploitation in hydrocarbon exploration.

Geophysical data inversion is a procedure for obtaining earth models that satisfy measured data sets. The inversion process can provide physically meaningful information concerning both rock properties and earth structure, and therefore is a useful tool for the earth scientists. Inversion has been applied in global seismology, exploration seismic, potential field, and electromagnetic exploration. See, for example, *Inversion of Geophysical Data*, L. R. Lines, Ed., Society of Exploration Geophysicists (1988). 3D inversion of EM data can provide unique information related to reservoir location, shape and fluid properties. However, current 3D EM inversion schemes require expensive computer resources even to obtain low-resolution images.

The inversion process is closely related to forward modeling. Forward modeling uses a mathematical relationship (Maxwell's electromagnetic field equations for CSEM and MT) to simulate the earth's response for a given set of model parameters. Forward modeling can be written symbolically as $d=F(m)$, where (for electromagnetic problems) m is a model of the earth's resistivity, F is known from Maxwell's equations for the EM fields, and d is a vector of response of the model m. Forward modeling provides a means to compute d for any model m. The inverse problem corresponding to this forward problem would be to find the set of all m that yield the given data d (a field or synthetic data set for inversion). It may be written, again symbolically, as $m=F^{-1}(d)$. This inverse operator $F^{-1}$ is nonlinear, very complicated and non-unique for EM inversion. A simple and computationally tractable approach to the nonlinear multi-dimensional inverse problem is the linearized inversion. The nonlinear relationship between data and model in the forward problem is approximated by $d=F(m_0)+G\delta m$. The model update $\delta m$ to a known (or guessed) model $m_0$ can be obtained by solving a linear system $G\delta m=b$, where G is the Jacobian matrix and $b=d-F(m_0)$ is the data residual. The model can be updated iteratively by adding $\delta m$ to $m_0$ until a satisfactory fit to the data has been obtained. The inverse problem and its solutions have been studied extensively (see, for example, R. L. Parker, *Geophysical Inverse Theory* (1994); W. Menke, *Geophysical Data Analysis: Discrete Inverse Theory* (1989); and A. Tarantola, *Inverse Problem Theory*, (1987)).

There are at least four major problems with EM inversions: The first problem is that many solutions are acceptable for inversion from a mathematical viewpoint (i.e., the non-uniqueness problem), especially when the data are limited and inaccurate. Mathematical approaches such as regularization are often implemented in inversion to mitigate some aspects of non-uniqueness. The second problem with multi-dimensional inversion is the cost. The linear equation system resulting from linearization is often very large for a multi-dimensional problem and requires the use of a supercomputer or massively paralleled computer system, particularly for CSEM data inversion. Newman and Alumbaugh inverted a synthetic data set of 12,600 source-receiver pairs with 1 frequency for a moderate 3D model with 29,971 cells. The processing time needed to produce a useful image was approximately 31 hours on the 1728-processor Intel Paragon, with 512 processors utilized (Newman and Alumbaugh, "Three-dimensional massively parallel electromagnetic inversion—I. Theory," *Geophys. J. Int.* 128, 345-354 (1997)). It could take over a month to invert a large EM field data set for a large 3D model even on modern massively-parallel machines, which therefore limits 3D EM inversion application. The third problem with EM inversion is related to inversion resolution. Due to the diffusive nature of the EM field at low frequency, the resolution provided by EM is very low and cannot compete with seismic resolution. In general, a highly simplified picture (a blurred image) of 3D structures is all that can be obtained for EM inversion (West and Macnae, "Physics of Electromagnetic Induction Exploration Method," in *Electromagnetic Methods in Applied Geophysics* (ed. M. N. Nambighian), Vol. 2, 5-45, Society of Exploration Geophysicists (1987)).

The fourth problem is related to model discretization in numerical modeling. Both multi-dimensional forward modeling and inversion are normally based on a discretized model. Discretization depends on the employed numerical modeling method (for example, the finite difference method, the integral equation method, the finite element method, or other method). Features and requirements on discretization for each method can easily be found in numerical modeling books. In principle, in order to model fine structures and achieve accurate forward modeling results, the model needs be discretized finely enough. FIG. 1 shows a uniform rectangular grid which is preferred for the finite difference method. This same fine discretization is typically used for both forward and inversion. That is, numerical methods of iteratively solving the inversion problem necessarily involve forward modeling at each iteration step, and it is typical to use the same discrete grid for each. The use of fine discretization in the inverse process has adverse effects: (1) it generates a huge system of linear equations (specially for the finite difference method), which needs a lot of computer resources for a reasonable turn-around time; (2) it may worsen the non-uniqueness because EM methods cannot resolve a small cell at depth due to lack of sensitivity (For example, cell j in FIG. 1). From another viewpoint, the contributions to response due to source TX measured at receiver RX from cell i at shallow depth and a deeper lying cell j of the same size are significantly different. In other words, receiver RX is much more sensitive to cell i than to cell j. Therefore, it is not optimal to treat them in the same way in inversion. The inversion non-uniqueness and the low EM resolution affect each other to make EM inversion much more challenging.

In reality, the unknown model m is a function of position, which is of infinite dimension, and the measurements d comprise only a finite collection of numbers with error, so that the inverse problem is not unique. As already mentioned non-uniqueness is a serious problem in inversion. A variety of approaches have been proposed to deal with the non-uniqueness problem. One approach has been to find localized averages that are shared by all models that are close enough to some reference model for a linearization approximation to hold (Backus and Gilbert, "The resolving power of gross earth data," *Geophy. J. R. astr. Soc.* 16, 169-205 (1968); Parker, "The inverse problem of electromagnetic induction: existence and construction of solutions based on incomplete data," *J. Geophys. Res.* 85, 4421-4428 (1970); Oldenburg, 1979, "One dimensional inversion of natural source magnetotelluric observations," *Geophysics* 44, 1218-1244 (1979)). A second approach has been to find models minimizing some functional, particularly functionals that penalize roughness of the model (Tikhonov and Arsenin, *Solutions of ill-posed problems*, John Wiley and Sons (1977); Parker, "The theory of ideal bodies for gravity interpretation," *Geophy. J. R. astr. Soc.* 42, 315-334 (1975); Constable et al., "Occam's inversion: a practical algorithm for generating smooth models from EM sounding data," *Geophysics* 52, 289-300 (1987); and Smith and Booker, "Magnetotelluric inversion for minimum structure," *Geophysics* 53, 1565-1576 (1988)). A third approach has been to assume prior knowledge of the distribution of likely models and find which of these models is most likely given a set of data (Franklin, "Well-posed stochastic extensions of ill-posed problems," *J. Math. Anal. Appl.* 682-716 (1970); and Jordan and Franklin, "Optimal solutions to a linear inverse problem in geophysics," *Proc. Nat Acad. Sci.* 68, 291-293 (1971)). A fourth approach (called joint inversion or cooperative inversion) has been to jointly invert various independent geophysical data sets (Vozoff and Jupp, "Joint inversion of geophysical data," *Geophy. J. R. astr. Soc.* 42, 977-991 (1974); Savino et al., "Simultaneous inversion of multiple geophysical data sets for earth structure," *SEG 45th Annual International Meeting* (1980); Lines et al., "Cooperative inversion of geophysical data," *Geophysics* 53, 8-20 (1988); and Benech et al., "Joint inversion of EM and magnetic data for near-surface studies," *Geophysics* 67, 1729-1739 (2002)). When dealing with specific or known structures derived from other geological and geophysical information, constrained inversion is employed to incorporate the specific structures into inversion. Wu incorporated structural constraints into model by inserting a discontinuous boundary within model; freezing the model at the specific nodes; and allowing different measures of model roughness in specified areas ("High resolution electromagnetic image of conductivity structure in the mid-lower crust and upper mantle—A magnetotelluric experiment conducted primarily in North Dakota," Ph.D. Dissertation, Univ. of Washington (1994)). Structural information is also incorporated into seismic tomography (Grau and Lailly, "Sequential migration-aided reflection tomography: an approach to imaging complex structures," *Journal of Applied Geophysics* 30; 75-87 (1993); Clapp, et al., "Incorporating geological information into reflection tomography," *Geophysics* 69, 533-546 (2004)). The first three approaches use mathematic constraints to mitigate the non-uniqueness. Such constraints may not be consistent with the reality and therefore the inversion may provide an image inconsistent with the truth. The last two approaches use physical constraints from independent data sets which are consistent with the reality.

All of the preceding approaches result in a very large linear system to solve. Options to solve a very large linear system are very limited. A powerful computer is often needed in order to obtain results in a reasonable time. Nevertheless, a number of techniques have been developed to speed up computation at different stages of the inverse process. For example, more efficient optimization techniques such as non-linear conjugate gradient (NLCG) solver, multi-grid for modeling, approximate computation for sensitivity matrix, reciprocity application for source and receiver configurations, etc. All those techniques are helpful, but more improvements are needed to make 3D EM inversion a routine practice with reasonable demand on computer resources.

Non-uniqueness and resolution affect each other. Theoretically, the mathematical approaches to the non-uniqueness problem do not provide new information to enhance the resolution of a data set, rather than post constraints on model. However, they do affect the final image because of the implementation of mathematical constraints on the model. Joint inversion and constrained inversion not only mitigate the non-uniqueness but also enhance the resolution. Joint inversion results in a much larger linear system and therefore is more expensive to apply in practice. Even though constrained inversion utilizes some structural information in inversion, its inversion is still implemented to recover the geometry of structures as well as their physical properties. Therefore, the resolution provided by constrained EM inversion is largely limited by the diffusion nature of EM fields.

It is convenient and simple to use the same discretization in implementation of both forward modeling and inversion. No techniques that deal with the problem of using the fine discretization in inversion were found in EM inversion publications. In seismic tomographic inversion, the matrix transformation is used in order to use non-uniform grids, which is better for constructing a physical property model of a subsurface region (PCT International Publication No. WO2007/018869).

The present invention provides a faster method for inverting EM data with lower demand on computer resources for physically constrained solutions of high resolution.

SUMMARY OF THE INVENTION

In one embodiment, the invention is a method for inverting measured data from a controlled-source electromagnetic survey of a subsurface region to generate a resistivity data volume representing the subsurface region, comprising:

(a) selecting a discrete forward-modeling grid to represent at least a portion of the subsurface region;

(b) determining geometry information for structural units of the subsurface region from seismic or other available data;

(c) generating an inversion grid with a mesh based on the structural unit geometry, the inversion grid containing fewer cells than the forward modeling grid;

(d) specifying an initial resistivity model of the portion of the subsurface region, said model having a value of resistivity for each cell in the inversion grid;

(e) solving Maxwell's electromagnetic field equations on the forward-modeling grid at one or more frequencies for a plurality of source-receiver survey positions, said frequencies being selected from the frequency spectrum of the survey's source waveform, said solution using survey source-receiver geometry information and source parameters and resistivity values from the resistivity model; and (f) generating an adjusted resistivity model by comparing the computed electromagnetic field values to the measured survey data, said comparison including minimizing a selected objective function, thereby using differences between computed electromagnetic field values and measured survey data to determine resistivity model adjustments.

In many applications, steps (e) and (f) will be repeated until a pre-selected convergence criterion or other stopping point is reached, replacing the resistivity model used in step (e) in each iteration cycle by the adjusted resistivity model from step (f) of the previous cycle.

BRIEF DESCRIPTION OF THE DRAWINGS

The present invention and its advantages will be better understood by referring to the following detailed description and the attached drawings in which.

The invention will be described in connection with its preferred embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the spirit and scope of the invention, as defined by the appended claims.

DETAILED DESCRIPTION OF THE PREFERRED EMBODIMENTS

The present invention, takes advantage of different geophysical data sets to obtain a resistivity earth model of higher resolution than can be achieved by one data set alone. More specifically, the geometry information of the structures is fully determined/preset by other measurements and prior spatial information before inversion, and therefore the measured EM data are inverted only for the properties, i.e. resistivities for EM inversion, of the predetermined structural units.

Traditionally, EM inversion is used to solve for both the geometry information of structures (i.e. locations, shapes, etc) and their physical properties (i.e. resistivities). The present inventive method inverts EM data to recover only the physical properties of the structures by incorporating the geometry information of the structures obtained from other measurements such as seismic and logs, which have much higher resolution. When EM methods are applied to potential targets, the targets have typically been first determined and delineated by seismic survey. Seismic data can provide much finer scale information about the subterranean structures in the survey area than EM methods. Incorporating the structures from seismic and other surveys such as logs into EM data inversion greatly improves EM inversion in resolution and reduces the problem of getting non-unique solutions. Once the geometry of the structures is set, the freedom of changing resistivities of the structures to best fit the EM data is dramatically decreased, i.e. the problem becomes much less non-unique. By contrast, conventional constrained inversion techniques aim to utilize known information, but never to completely use other surveys with higher resolution for geometry information.

Figure 1:
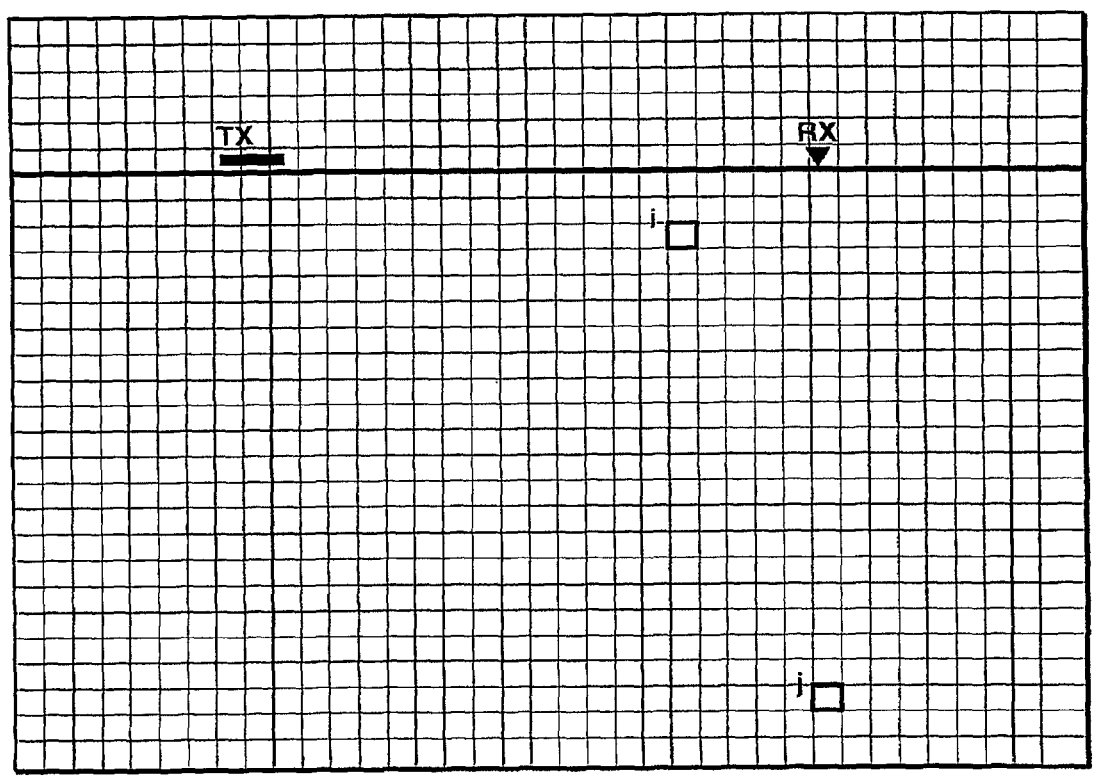
FIG. 1 illustrates a typical fine scale discrete grid typically used for both forward modeling and inversion.
Figure 2:
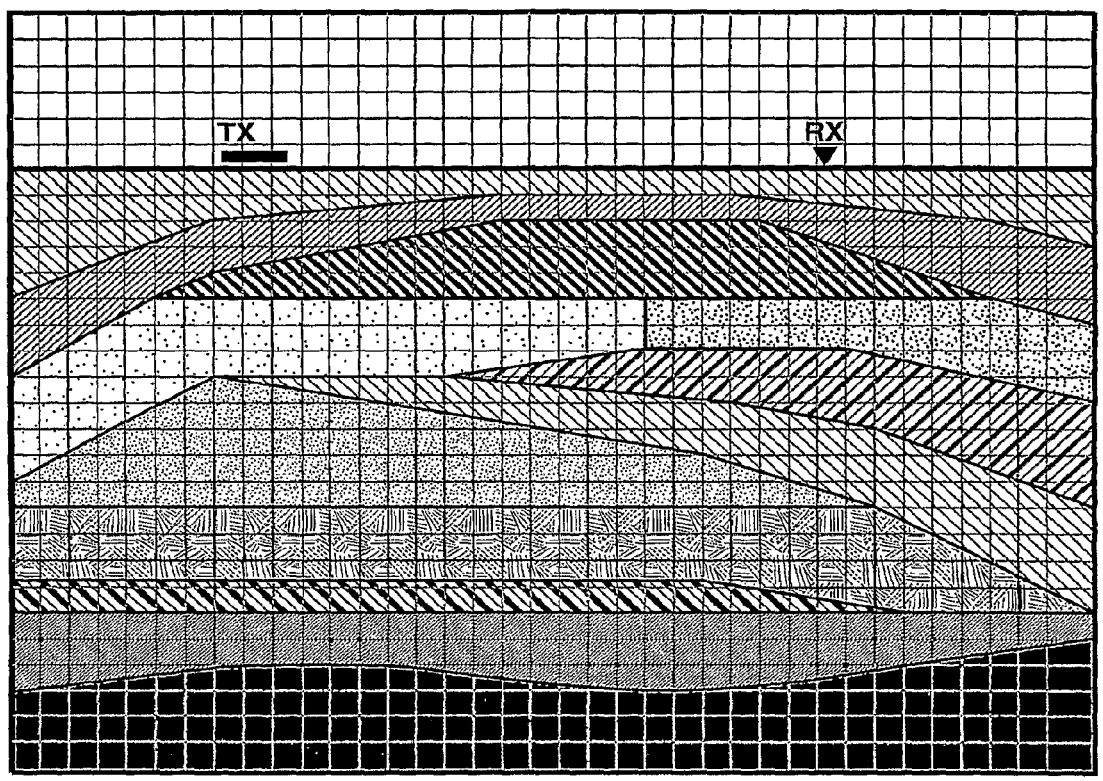
FIG. 2 illustrates different model discretizations for inversion as compared to forward modeling.

The present invention also separates the model discretization for inversion from that for forward modeling. FIG. 2 shows an example of different discretizations for forward modeling and inversion. A fine discretization, a rectangular mesh in FIG. 2, is for forward modeling to accurately model EM fields everywhere. The irregular mesh (Twelve irregular shaped, much larger cells, indicated by the different shadings) is for inversion. This inversion mesh consists of structural units determined by other geophysical measurements with high resolution such as seismic and logging. Currently a typical 3D EM inversion of a field data set has unknowns on the order of $10^6$ if the same discretization is used. Units of interpreted structures from seismic could be about $10\sim10^3$. The reduction in unknowns (3 orders of magnitude or more) can significantly increase the inversion speed and require less computer resources, therefore low cost.

Figure 3:
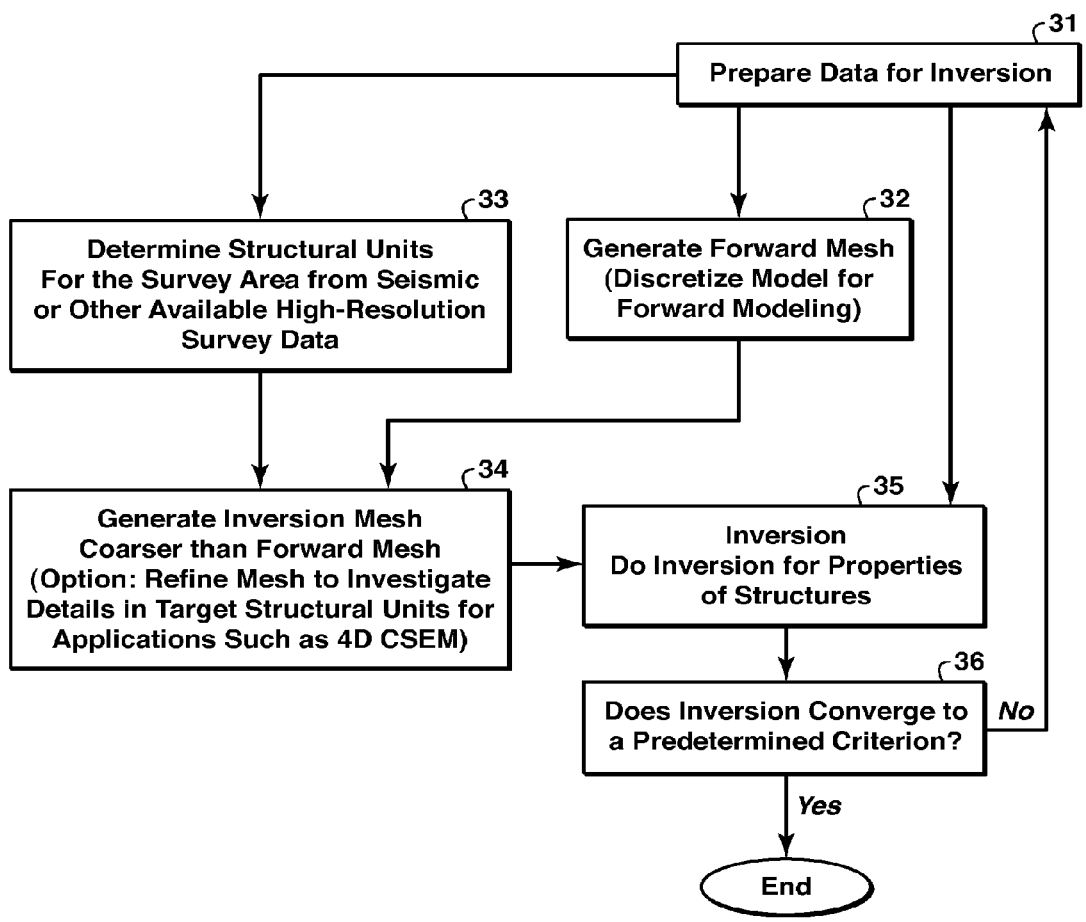
FIG. 3 is a flow chart showing basic steps in one embodiment of the present invention.

This method is flexible in order to include all structural units including those regarded as background. This will reduce error in inverted results caused by fixing background if the background is not determined accurately. The process of incorporating the geometry information of structures can be iterative. FIG. 3 is a flow chart showing basic steps in one embodiment of the invention.

At step 31, the measured data are prepared for inversion. Because of the well known skin depth effect, EM signals decay exponentially with distance from the source (or, transmitter) for a specific frequency. The receiver cannot record high quality signals when the source is far away from the receiver because of ambient noises. When the source is too close to the receiver, the receiver is saturated because of its limited dynamic measurement range. In this situation, the measured signals are distorted. It is preferred in the present invention that data are selected from intermediate source-receiver offsets such that the source can generate signals strong enough at the receiver location to have good S/N (signal-to-noise ratio), but not so strong as to saturate the receiver. In addition, accurate source and receiver geometry measurements are required for the selected data. The term geometry includes orientations and coordinates of both the receiver and transmitter. Even within a selected offset range, data may not be ideal for inversion because of effects such as source instability, individual receiver electronic characteristic, temporally changing natural EM signals, and oceanic waves. The user of the present invention may wish to manually pick data to use, possibly with the help of interactive data display software, or according to experience.

In CSEM surveying, both amplitude and phase are typically obtained for each EM field component that is measured. Either amplitude or phase data, or both, can be used for the inversion step of the present invention. For example, it could happen that the phase data are assessed as having accuracy problem, in which case amplitude alone would be preferred for use in the inversion. In the most ideal situation, both amplitude and phase data of both the electric and magnetic fields, all six components, are included in the inversion. In practice, data for as many EM components as possible are preferably included because of noise and the different sensitivity of each component to structures. It is also preferable to include as many frequencies and source-receiver combinations as possible. More data are more expensive to acquire, and require more computer time to process, but give more accurate results.

CSEM survey data are measured in the time domain. The present inventive method is preferably performed in the frequency domain, in which embodiments the data must be transformed to the frequency domain by Fourier transformation or other methods. In the frequency domain, the data become complex numbers. The present inventive method may be performed using only the real part of the selected data, or only the imaginary part, or both. Equivalently, as stated above, the invention may be performed with only amplitude data, or only phase data, or both.

At step 32, the model is discretized for forward modeling. Discretization of the model is used to reduce a continuous model to an equivalent discrete model that is suitable for a high-speed solution on a computer using numerical methods. Instead of developing a solution defined everywhere, approximations are obtained at the isolated cell and node locations. (Each cell typically contains one point called a node at which data values are considered to apply to the entire cell.) Development of discrete approximations can proceed by several numerical methods, notably finite difference methods, finite element methods, boundary element methods, and integral equation methods. Proper discretization is required in order to obtain sufficiently fast and accurate solutions. For CSEM, the required discretization (expressed in skin depths) is different for each of the numerical methods mentioned above even for the same problem. As a general rule, at least 3 or more nodes are needed within one skin depth. Close to the transmitter the mesh may need to account for the geometric singularity created by the transmitter. Multi-meshes may be efficient if frequency band is very wide. This discretization is used for forward modeling.

Figure 7:
FIG. 7 shows an example section of seismic data.
Figure 8:
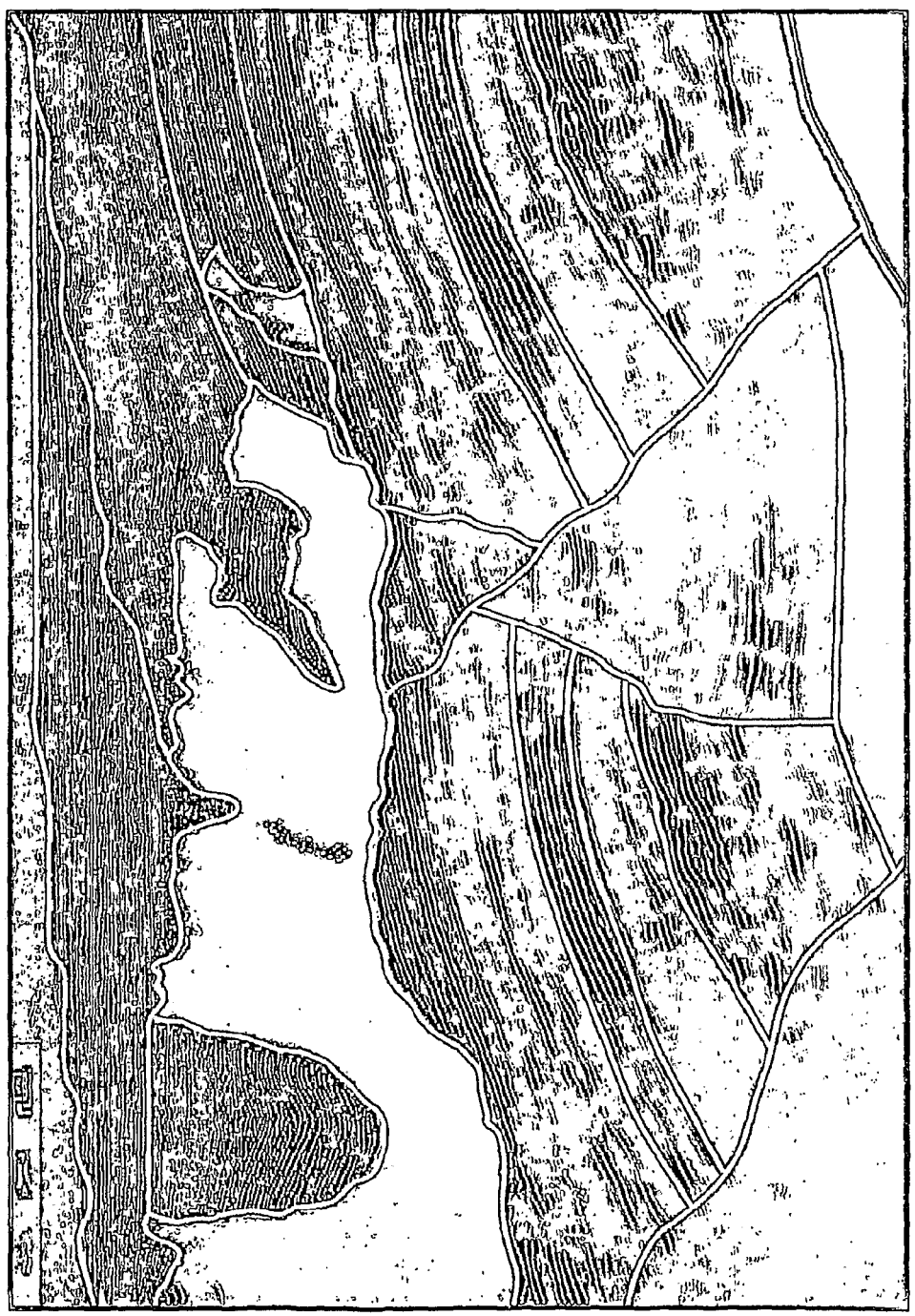
FIG. 8 shows structural units interpreted from the seismic profile of FIG. 7.

At step 33, structural units are determined from other high-resolution geophysical surveys, preferably seismic and/or well logs. One can interpret a seismic profile or data cube to generate structural units. For example, FIG. 7 is a PSDM seismic section for the west part of BP Benchmark model (F. J. Billette and S. Brandsberg-Dahl, Paper B035, EAGA 67$^{th}$ Conference & Exhibition—Madrid, Spain, Jun. 13-16, 2005). One can generate a set of structural units by interpreting this seismic section. FIG. 8 presents one interpretation and its structural units are outlined by thick white lines. One can also directly use the seismic interpretation if available. It is preferable to generate structural units with inputs from seismic interpreter and geologist.

At step 34, an inversion mesh is generated, i.e., the model is discretized for inversion. The generated structural units can be directly used as cells in the inversion mesh. Alternatively, depending on geometry considerations in connection with the structural units, one may tie together forward-modeling cells that belong to the same structural units to form discretization for inversion. Structural units can be further discretized if they are deemed too large to satisfy conditions for successful inversion, or if they represent target formations and therefore would benefit from more detail for applications such as 4D CSEM. The significance of the inversion mesh is that it determines how the resistivity model will be defined in discrete space, i.e. discretized.

Figure 9:
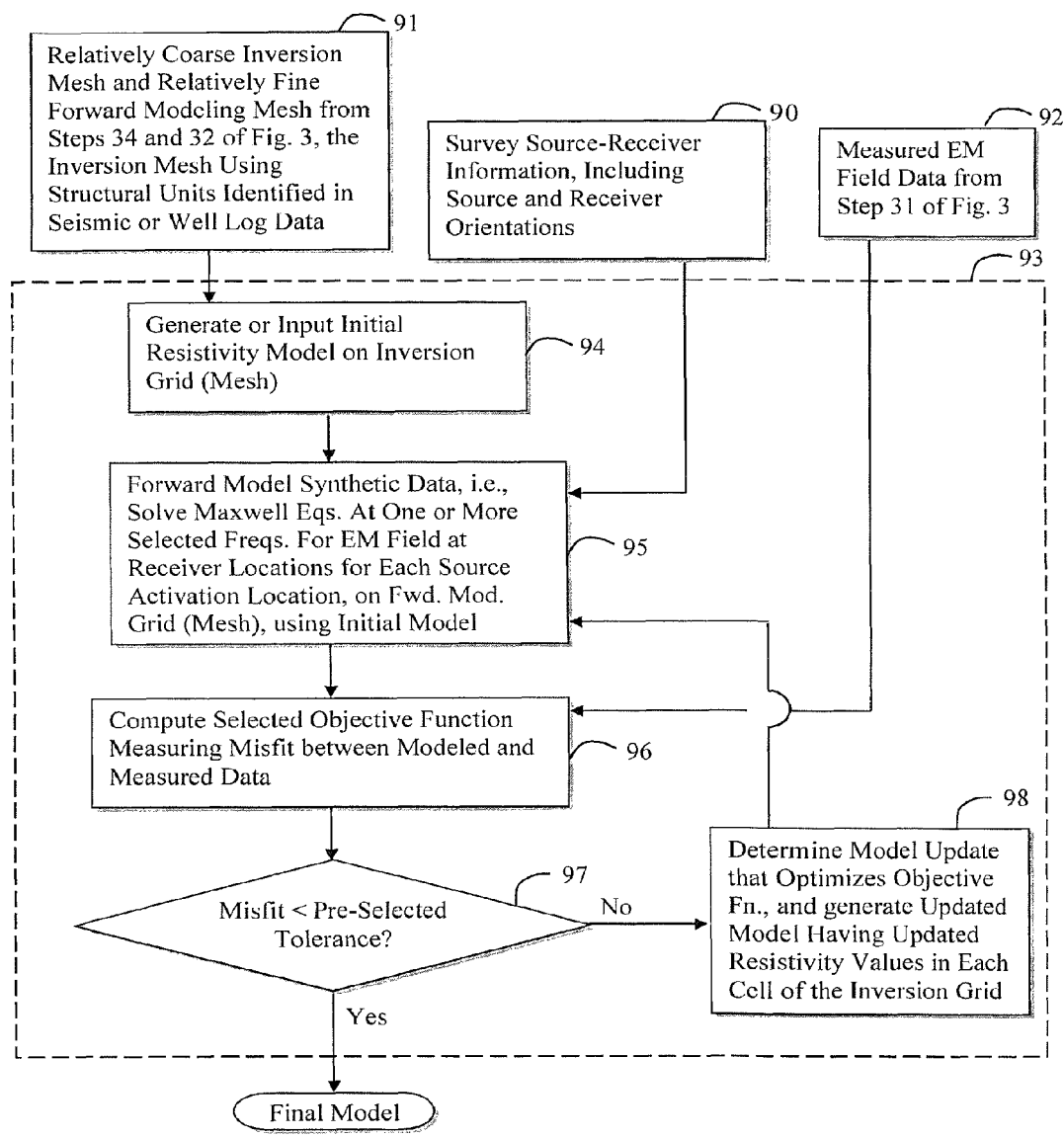
FIG. 9 is a flowchart showing how steps 35 and 36 of FIG. 3 may be expanded in more detail in one embodiment of the present inventive method.
Figure 10:
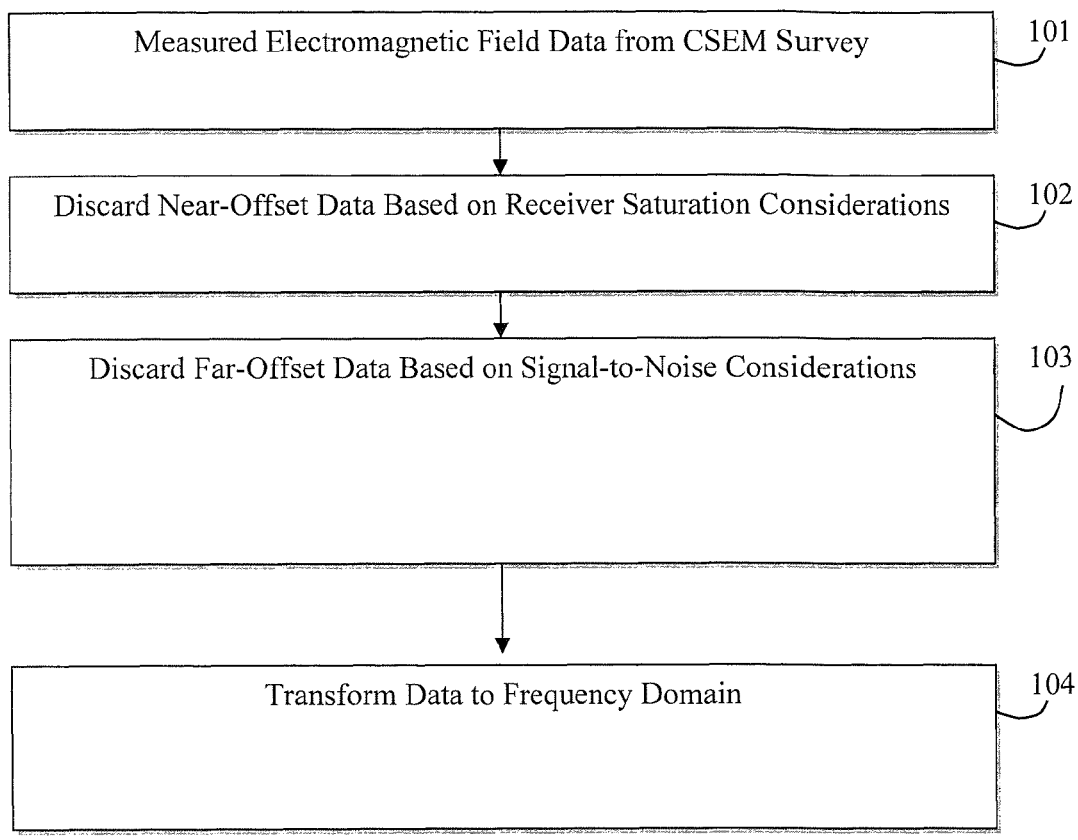
FIG. 10 is a flowchart showing basic steps for data preparation in step 31 of FIG. 3 in one embodiment of the present invention, wherein CSEM survey data are obtained in step 101, then some near offset data are discarded based on receiver saturation considerations in step 102, then some far offset data are discarded based on signal-to-noise considerations in step 103, and finally the data are transformed to the frequency domain in step 104.
Figure 11:
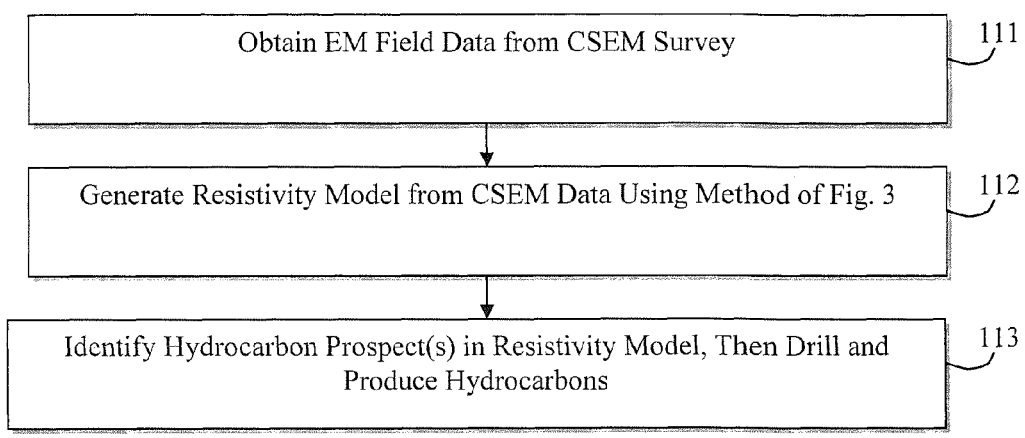
FIG. 11 is a flowchart illustrating how the present inventive method may be used in prospecting for and producing hydrocarbons, wherein CSEM survey data are obtained in step 111, then in step 112 a resistivity model of the subsurface is generated from the CSEM data using an embodiment of the present inventive method such as the one illustrated in FIG. 3, and finally in step 113 a hydrocarbon prospect may be identified in the resistivity model, after which a well may be drilled into the prospect to produce hydrocarbons.

At step 35, the selected data are then inverted to determine the physical properties of structural units, i.e. resistivity (or conductivity) for CSEM inversion. The flowchart of FIG. 9 shows typical steps in parameter estimation by data inversion. Electromagnetic signals recorded by the receiver are related to earth resistivity structures. This relationship (i.e., the forward problem) can be written as d=F(m), where d is a vector of measured data (92), m is a model of the earth's resistivity, and F is known from Maxwell's equations for the EM fields and provides a means to compute d at step 95 for any model m and transmitter and receiver geometry (90). It is well known that the earth's resistivity structures (i.e. both resistivity and geometry) can be recovered from the CSEM measurements by using relationships provided by the above equation (Lu, et al. *Geophys. J. Int.* 138, 381-392 (1999)). This process of using the "forward" equation to infer certain model variables that F depends on is called the inverse problem, or simply inversion. This invention uses the inverse process to recover physical properties of structural units (i.e. resistivity only). This inverse process typically involves computation of an objective function measuring misfit between modeled and measured data (96), and can be simply written as follows:

$$\text{minimize objective function} = \|\underline{W}d - \underline{WG}p\| + \lambda R(m)$$

where $\underline{W}$ is a weighting matrix, $\underline{G}$ is a forward operator linearized from F, p is a vector of inverted parameters which includes both a model of earth resistivity (and possibly other parameters such as receiver orientations), R(m) is a regularization term to mitigate the non-uniqueness of inversion, and λ is a regularization parameter. Acceptable answers may be obtained, however, with the regularization term set equal to zero, and using a least-squares iteration scheme. (The double vertical lines indicate a way to compute the "distance" between measured data and predicted data. Typically norm 2 is used (i.e. least-squares scheme). Sometimes norm 1 is used (i.e. absolute value), but other norms can also be used.) The forward-modeled EM field results 95 are compared to the measured data 92 at step 97, and the resistivity (or other cell property) model is adjusted accordingly at step 98 for the next iteration. At each iteration, Maxwell's equations are solved at step 95 by numerical techniques for electric or magnetic fields on the forward-modeling grid, using values of resistivity as currently defined on the inversion grid. (All forward-modeling cells lying within an inversion grid cell will have the same value of resistivity.) The technique of minimizing an objective function is a known, sophisticated way of performing the inversion, i.e. comparing forward-modeled to measured electromagnetic field values and determining what adjustments to make to the resistivity model to reduce the differences. The computations involved (step 98) in minimizing the selected objective function are performed on the inversion grid. The iterative cycle may be repeated until a predetermined convergence criterion 97 or other stopping point is reached. In some cases, it may be desirable to change the forward mesh (grid) or the inversion mesh that were selected at step 91 before performing more iterations. (Step 36 in FIG. 3) The initial resistivity model 94 assumed to begin the iterative process may be estimated from available information or simply be a guess. The forward-modeling computations and the inversion computations, as schematically indicated by the dashed-line box 93 in the flowchart of FIG. 9, are typically performed on a digital computer.

Minimizing an objective function iteratively is the most efficient way currently known to invert a large set of data. (Other methods are known, however, to persons skilled in the art.) The particular objective function written above, while general, does not embrace all objective functions that can be used in the present invention, as a person skilled in the art will appreciate. It is mentioned as an example.

The inverse problem and its solutions have been studied extensively. See, for example, R. L. Parker, *Geophysical Inverse Theory*, Princeton University Press, Princeton, N.J. (1994); W. Menke, *Geophysical Data Analysis: Discrete Inverse Theory*, Academic Press, San Diego, Calif. (1989); and A. Tarantola, *Inverse Problem Theory, Methods for Data Fitting and Model Parameter Estimation*, Elsevier, Amsterdam, The Netherlands (1987). A benefit of the parameter reduction accomplished by the present inventive method is that in some cases, the inversion process can be accomplished by the more rapidly converging Gauss-Newton optimization approach as compared to the steepest descent or non-linear conjugate gradient approaches which are suitable for very large parameters (i.e., many unknowns). For details, reference may be had to, for example, the Tarantola reference mentioned above in this paragraph.

The inversion may be performed in 1D, 2D, or 3D.

EXAMPLES

Figure 4A:
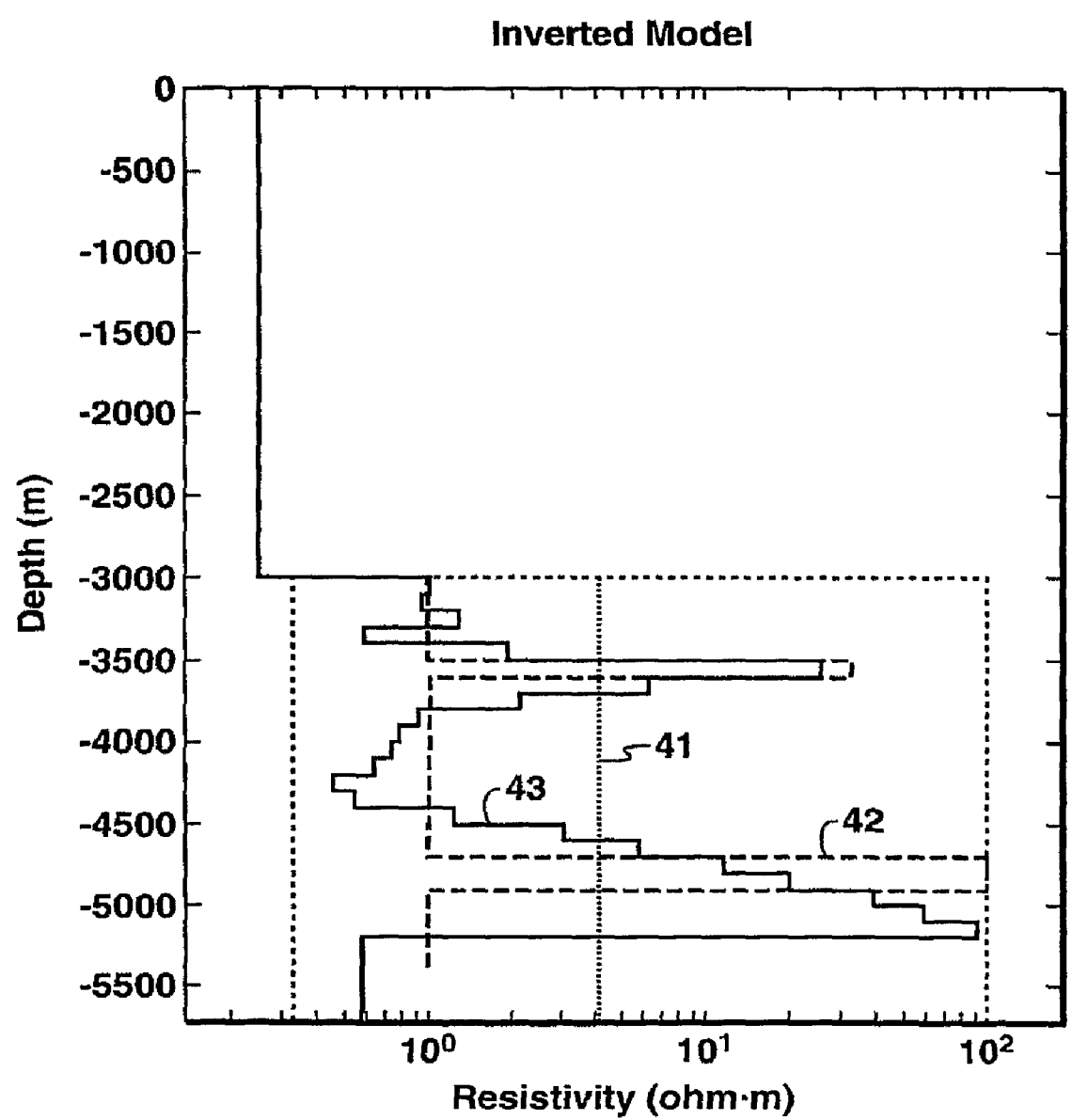
FIGS. 4A-4B show inverted results for different EM source frequencies using conventional inversion techniques.
Figure 4B:
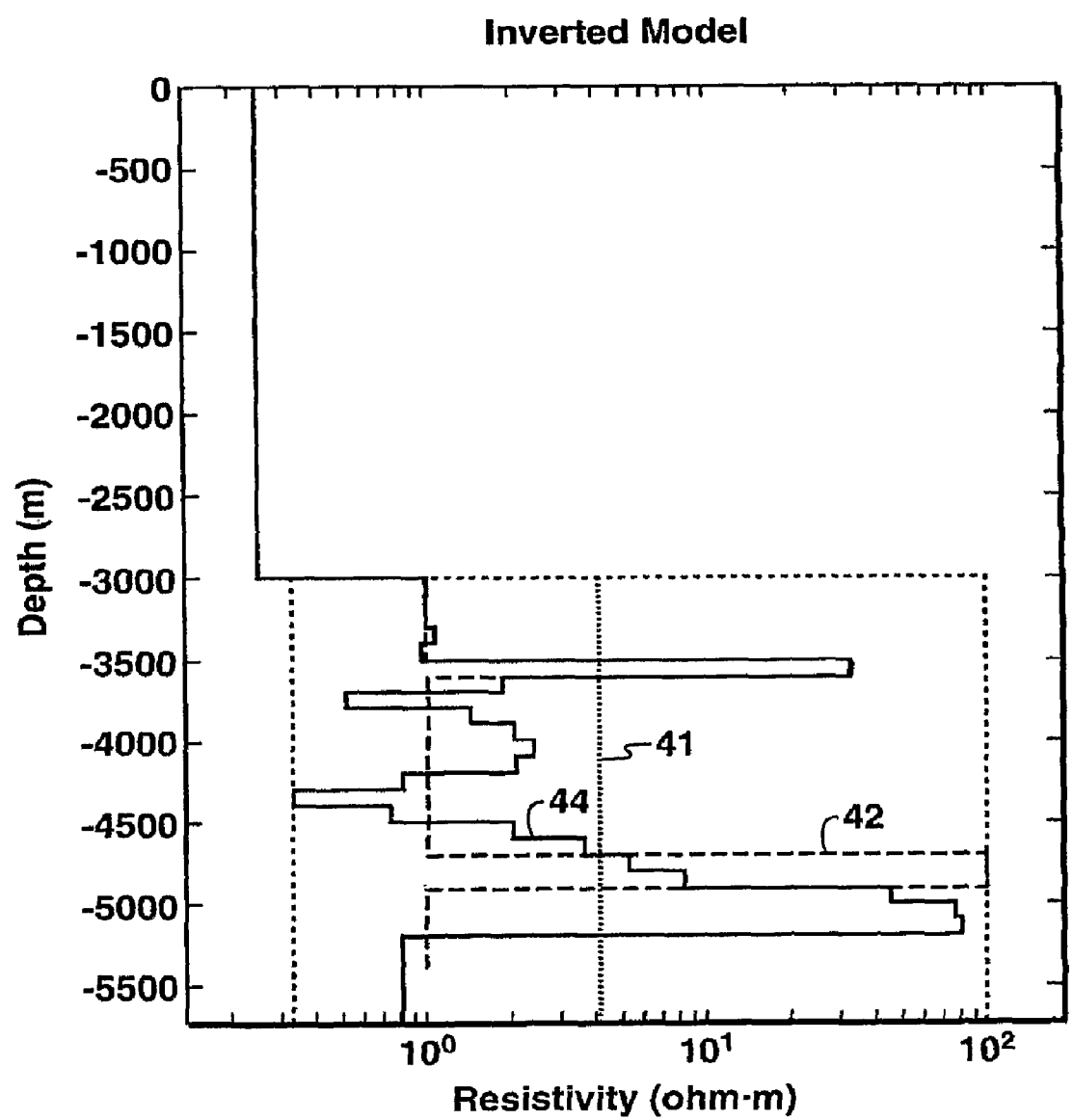

A number of models were tested using 1D inversion. FIGS. 4A-4B show inversion results from conventional CSEM data inversion, at which model discretization is fine enough in order to recover structures as well as resistivities. For FIG. 4A, the EM data corresponding to source frequencies of 0.5, 0.25 and 0.125 Hz were selected in step 31 for inversion. (Because inversion involves forward modeling, which must be performed at a single frequency, the EM data are decomposed by Fourier analysis or other method to the frequency domain, where the data components corresponding to the different frequencies in the source waveform's frequency spectrum are separated from one another.) For FIG. 4B, the same three frequencies were used, but in addition the data corresponding to three more frequencies were also inverted: 2.0, 1.0 and 0.0625 Hz. (The more data used, the better the result that can be expected, but the trade-off is that more computer time and/or resources are needed.) In both drawings, line 41 represents the initial resistivity model (a flat, or uniform, starting model was assumed). The broken line resistivity profile 42 represents the true model, i.e., the model that was assumed in generating the synthetic EM data used in the example. The solid line resistivity profiles 43 and 44 represent the profiles obtained by conventional (fine-mesh) data inversion.

Figure 5A:
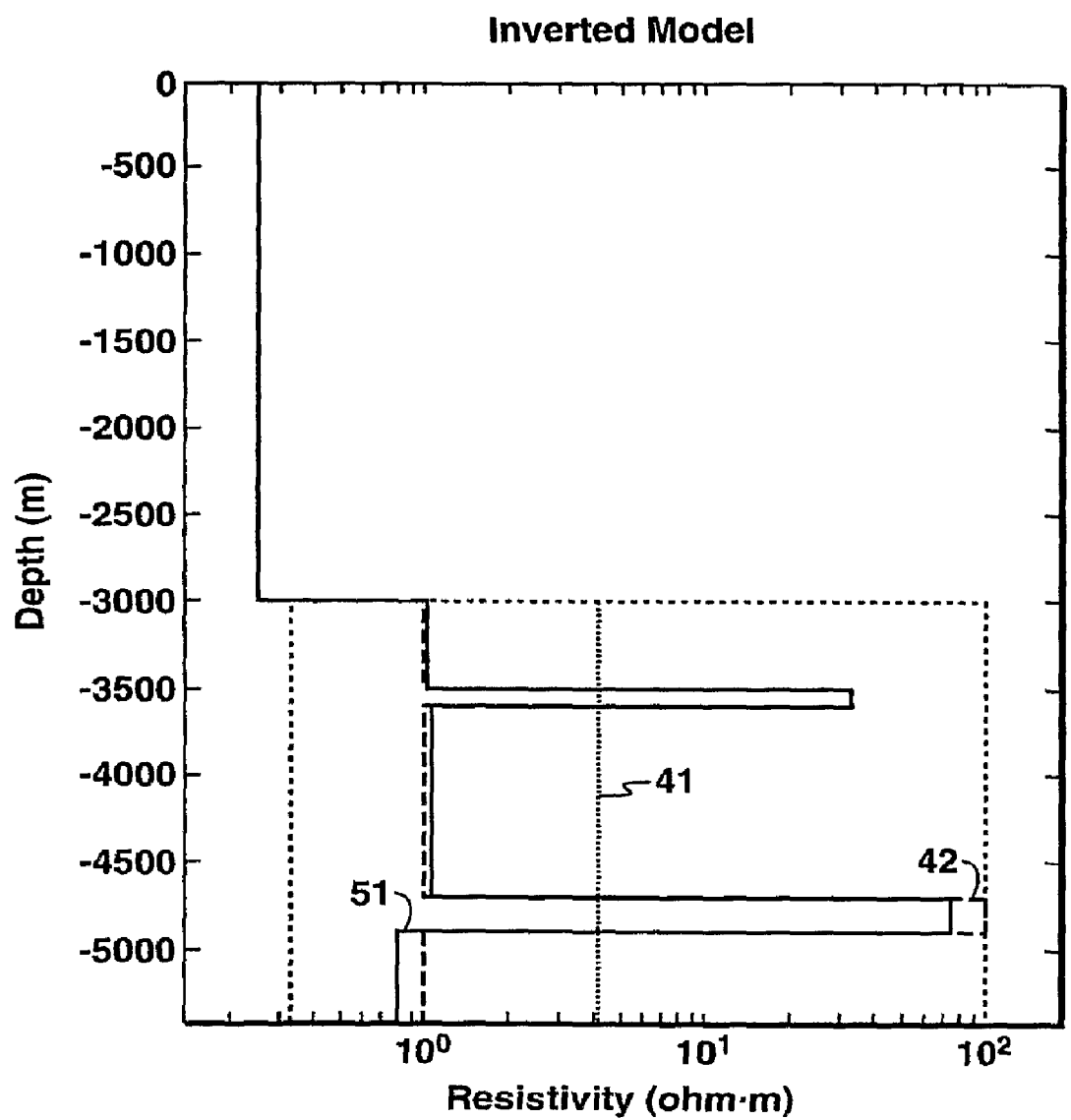
FIGS. 5A-5B show inverted results for different EM source frequencies using the present inventive method.
Figure 5B:
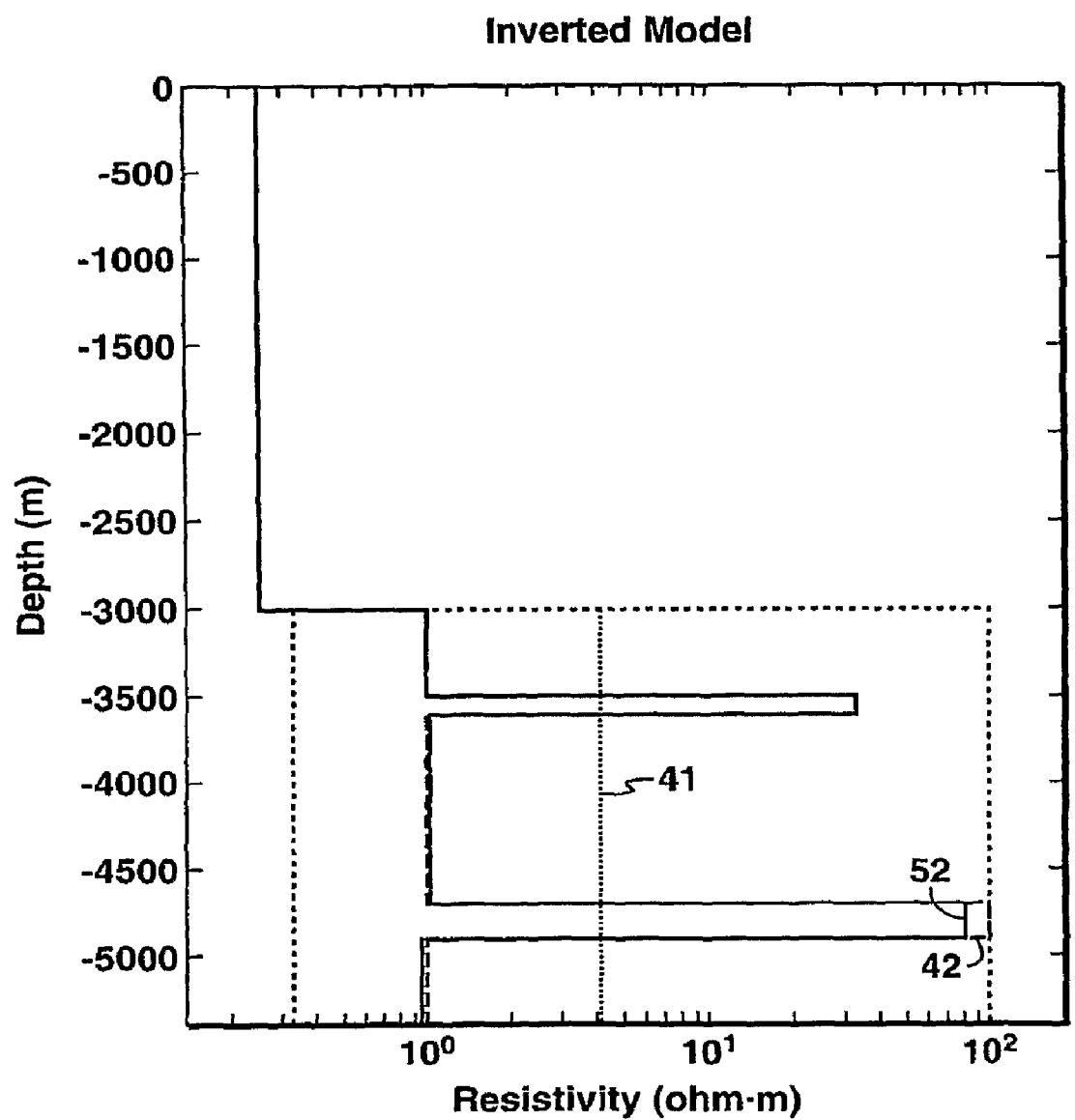
Figure 6:
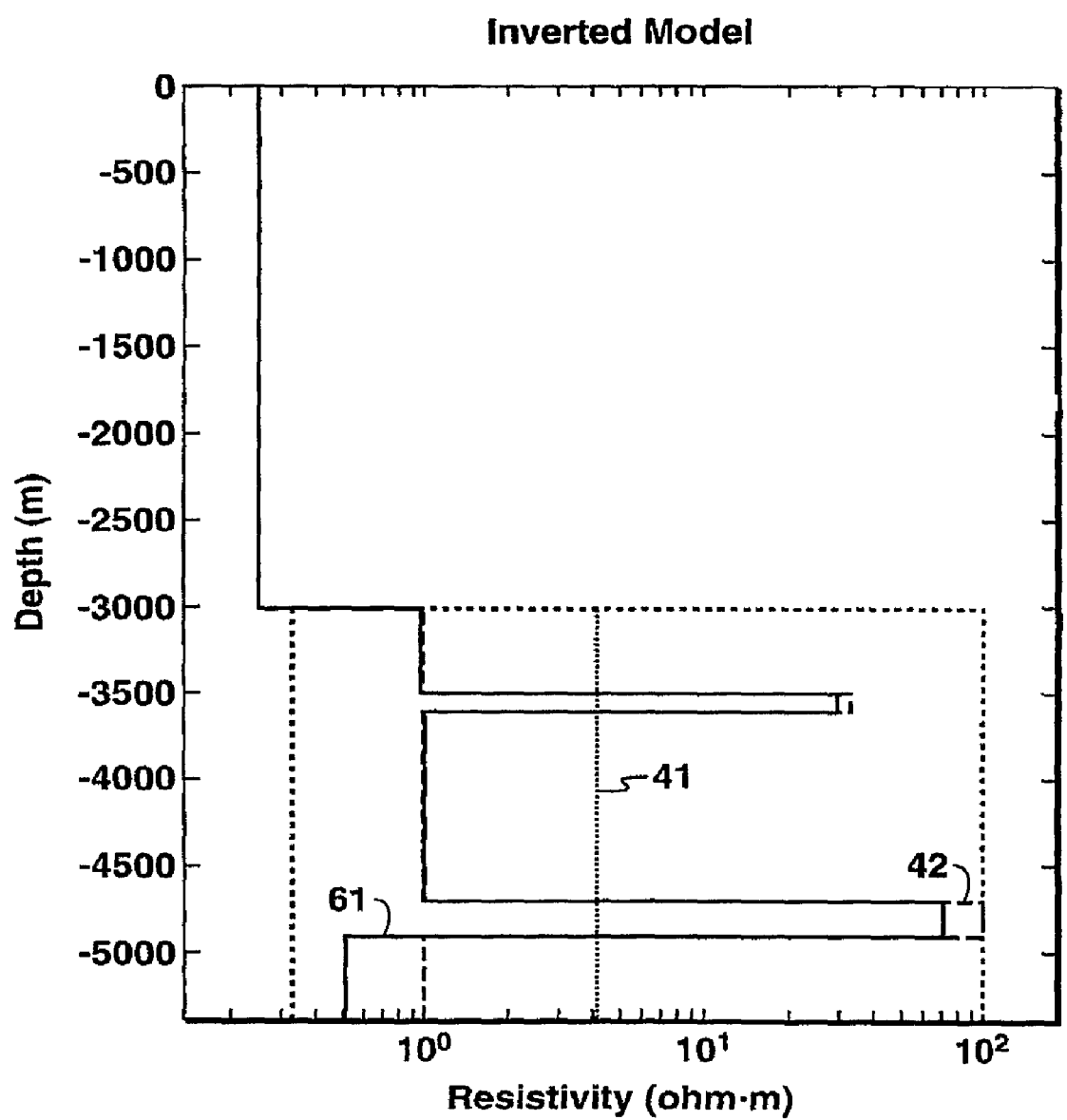
FIG. 6 shows inverted results at a single source frequency using the present inventive method.

FIGS. 5A-5B present inverted results 51 and 52 (solid line profiles) using the present inventive method of incorporating the known structures, for the same two sets of three and six frequencies, respectively. Both inversions have the same stop criteria and the data are fitted almost equally well. Comparing FIGS. 5A and 5B with FIGS. 4A and 4B for data of three and six frequencies, respectively, these examples demonstrate that the present inventive method can recover physical properties much better than the conventional CSEM inversion. FIG. 6 shows the inverted results (profile 61) from the present invention for a single frequency component of the data. Even this one-frequency data set recovered better physical properties than the conventional inversions with data of 3 and 6 frequencies.

The foregoing application is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims.

The invention claimed is:

1. A method for inverting measured data from a controlled-source electromagnetic survey of a subsurface region to generate a resistivity data volume representing the subsurface region, comprising:
    (a) selecting a discrete forward-modeling grid to represent at least a portion of the subsurface region;
    (b) determining geometry information for structural units of the subsurface region from seismic or other available data;
    (c) generating an inversion grid with a mesh based on the structural unit geometry, the inversion grid containing fewer cells than the forward modeling grid;
    (d) specifying an initial resistivity model of the portion of the subsurface region, said model having a value of resistivity for each cell in the inversion grid;
    (e) solving Maxwell's electromagnetic field equations on the forward-modeling grid at one or more frequencies for a plurality of source-receiver survey positions, said frequencies being selected from the frequency spectrum of the survey's source waveform, said solution using survey source-receiver geometry information and source parameters and resistivity values from the resistivity model; and
    (f) generating an adjusted resistivity model by comparing the computed electromagnetic field values to the measured survey data, said comparison including minimizing a selected objective function, thereby using differences between computed electromagnetic field values and measured survey data to determine resistivity model adjustments;
wherein at least (e) and (f) are performed on a computer programmed to perform (e) and (f).

2. The method of claim 1, further comprising cyclically repeating steps (e) and (f) until a pre-selected convergence criterion or other stopping point is reached, replacing the resistivity model used in step (e) in each iteration cycle by the adjusted resistivity model from step (f) of the previous cycle.

3. The method of claim 1, wherein the forward modeling and inversion are performed in a number of dimensions selected from a group consisting of: (a) one (1D); two (2D); and three (3D).

4. The method of claim 1, wherein each structural unit identified in the available seismic or other survey data is assigned one cell in the inversion grid.

5. The method of claim 1, wherein all cells in the forward modeling grid falling within a structural unit identified in the available seismic or other survey data are combined to make a single cell in the inversion grid.

6. The method of claim 1, further comprising initially preparing the survey data by discarding near offset data based on receiver saturation considerations and discarding far offset data based on signal-to-noise considerations, and transforming the data to the frequency domain so that components of the data corresponding to particular frequencies in the source's frequency spectrum are readily identifiable and separated.

7. The method of claim 1, wherein in the step of generating an adjusted resistivity model (the inversion step), only resistivity information is extracted by the inversion, the spatial and structural geometry information of the subsurface being specified by the inversion grid generated in a previous step.

8. The method of claim 1, wherein the survey source-receiver information includes source orientation and receiver orientation information.

9. The method of claim 1, wherein the objective function is expressed as $$\text{minimize objective function} = \|\overline{\overline{W}}d - \overline{\overline{W}}\overline{\overline{G}}p\| + \lambda R(m),$$

where $\overline{\overline{W}}$ is a weighting matrix, $\overline{\overline{G}}$ is a forward operator linearized from Maxwell's equations, p is a vector of inverted parameters which includes the adjusted resistivity model m resulting from minimization, d is measured data from the survey, R(m) is a regularization term, and $\lambda$ is a regularization parameter.

10. The method of claim 9, wherein $\lambda=0$ and a least-squares iteration scheme is used.

11. The method of claim 9, wherein p also includes unknown orientations for receivers used in the survey.

12. A method for producing hydrocarbons from a subsurface region, comprising:
  (a) obtaining measured electromagnetic field data from a controlled-source electromagnetic survey of the subsurface region;
  (b) obtaining a resistivity model of the subsurface region generated by inverting the measured electromagnetic field data, said inversion comprising using iterative updating of an initial resistivity model wherein a current model is forward modeled on a first grid while the initial resistivity model and all updated models are specified on a second grid based on geometry of structural units of the subsurface region, said structural units being determined from seismic or other high-resolution survey data, said second grid being of coarser mesh than said first grid, wherein at least said forward modeling and iterative updating are performed using a computer programmed to perform said forward modeling and iterative updating; and
  (c) producing hydrocarbons from resistive structures indicated in the resistivity model as updated in (b).

13. A method for inverting measured data from a controlled-source electromagnetic survey of a subsurface region to generate a resistivity data volume representing the subsurface region, comprising using iterative updating of an initial resistivity model wherein a current model is forward modeled on a first grid while the initial resistivity model and all updated models are specified on a second grid based on geometry of structural units of the subsurface region, said structural units being determined from seismic or other high-resolution survey data, said second grid being of coarser mesh than said first grid, wherein at least said forward modeling and iterative updating are performed using a computer programmed to perform said forward modeling and iterative updating.

* * * * *